US009485340B2

(12) United States Patent
Marui et al.

(10) Patent No.: US 9,485,340 B2
(45) Date of Patent: *Nov. 1, 2016

(54) AUTOMATED COMMUNICATION LINE SWITCHING FOR VOICEMAIL ACCESS

(71) Applicant: BlackBerry Limited, Waterloo (CA)

(72) Inventors: Keizo Marui, Waterloo (CA); Lawrence Edward Kuhl, Waterloo (CA); Ronald Scotte Zinn, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,683

(22) Filed: Jan. 12, 2015

(65) Prior Publication Data

US 2015/0126163 A1    May 7, 2015

Related U.S. Application Data

(63) Continuation of application No. 11/694,072, filed on Mar. 30, 2007, now Pat. No. 8,934,873.

(51) Int. Cl.
| | | |
|---|---|---|
| *H04M 11/10* | (2006.01) | |
| *H04M 1/725* | (2006.01) | |
| *H04B 1/38* | (2015.01) | |
| *H04M 3/533* | (2006.01) | |

(52) U.S. Cl.
CPC ....... *H04M 1/72519* (2013.01); *H04M 3/5335* (2013.01); *H04M 3/53333* (2013.01); *H04M 2250/66* (2013.01)

(58) Field of Classification Search
CPC ........... H04W 4/00–4/005; H04W 4/12–4/20; H04W 76/00; H04W 76/025; H04W 88/00; H04W 88/02; H04W 88/022; H04W 88/023; H04W 88/06; H04W 92/00; H04W 92/08; H04M 3/533

See application file for complete search history.

(56) References Cited

U.S. PATENT DOCUMENTS

| | | | |
|---|---|---|---|
| 5,422,936 A | 6/1995 | Atweil | |
| 5,448,622 A | 9/1995 | Huttunen | |
| 6,707,890 B1 | 3/2004 | Gao et al. | |
| 8,934,873 B2 | 1/2015 | Marui et al. | |
| 2002/0127999 A1* | 9/2002 | Brown | H04M 1/7255 455/412.1 |
| 2004/0121762 A1 | 6/2004 | Chou et al. | |
| 2004/0215845 A1* | 10/2004 | Davani | H04M 1/72547 710/22 |

(Continued)

FOREIGN PATENT DOCUMENTS

EP    1768360 A1    3/2007

OTHER PUBLICATIONS

European Patent Office, Extended European Search Report dated Jul. 25, 2008 in respect of EP Application No. 017105496.

(Continued)

*Primary Examiner* — San Htun
(74) *Attorney, Agent, or Firm* — Ridout & Maybee LLP

(57) ABSTRACT

A telephone station apparatus that is arranged to operate on two, or more, communication lines, receives an instruction to access a voicemail server. The telephone station apparatus switches from a first communication line to a second communication line and initiates a call to the voicemail server. At the voicemail server, calling line identification allows the voicemail server to present an interface to the voicemail box associated with the second communication line.

13 Claims, 7 Drawing Sheets

(56) References Cited

U.S. PATENT DOCUMENTS

2006/0234693 A1    10/2006   Isidore et al.
2007/0149176 A1    6/2007   Wells et al.

OTHER PUBLICATIONS

Canadian Intellectual Property Office, Requisition by the Examiner in Accordance with Subsection 30(2) of the Patent Rules dated Jul. 16, 2012 in respect of CA Application No. 2,627,797.
USPTO, Non-Final Rejection dated Oct. 5, 2009 in respect of U.S. Appl. No. 11/694,072.
USPTO, Final Rejection dated Mar. 29, 2010 in respect of U.S. Appl. No. 11/694,072.
USPTO, Non-Final Office Action dated Sep. 17, 2010 in respect of U.S. Appl. No. 11/694,072.
USPTO, Final Rejection dated Feb. 1, 2011 in respect of U.S. Appl. No. 11/694,072.
USPTO, Advisory Action dated Apr. 20, 2011 in respect of U.S. Appl. No. 11/694,072.
USPTO, Decision on Appeal dated Jul. 15, 2014 in respect of U.S. Appl. No. 11/694,072.
USPTO, Notice of Allowance dated Sep. 8, 2014 in respect of U.S. Appl. No. 11/694,072.

\* cited by examiner

AUTOMATED COMMUNICATION LINE SWITCHING FOR VOICEMAIL ACCESS

CROSS-REFERENCE TO RELATED APPLICATIONS

The present application is a continuation application of U.S. patent application Ser. No. 11/694,072, filed Mar. 30, 2007 and issued, a U.S. Pat. No. 8,934,873, on Jan. 13, 2015, the contents of which are hereby incorporated herein by reference.

FIELD

The present application relates generally to telephone station apparatus adapted to use more than one telephone communication line and, more specifically, to the selection of a communication line to use to check voicemail messages.

BACKGROUND

To satisfy mobile telephony device users that wish to use the same mobile telephony device for two purposes, a feature has been developed for the Global System for Mobile Communications (GSM) standard called "Alternate Line Service" or "ALS". ALS allows a single mobile telephony device to support two different destination numbers. More particularly, since all GSM mobile telephony devices operate in conjunction with a Subscriber Identity Module (SIM), commonly known as a SIM card, ALS allows a single SIM card to support two different destination numbers. Separation of work-related and personal telephone calls is a primary application for ALS.

Another telephony standard, called Code Division Multiple Access, or "CDMA", also allows a single mobile telephony device to support two different destination numbers. CDMA telephony devices may have a dual-NAM feature or a multi-NAM feature offering users the option of registering the telephony device with a local number in more than one market. A NAM is a Number Assignment Module, the electronic memory in the cellular phone that stores the destination number and an electronic serial number.

A mobile telephony device that supports two, or more, different destination numbers, and, accordingly, is associated with two, or more, communication lines, can only have a single communication line active at one time. Typically, a series of key presses is all that is necessary to switch the active communication line from one communication line to the other.

For most mobile telephony systems, voicemail messages are stored by a central voicemail server. Often a caller is connected to the voicemail server responsive to a failure to complete a connection to a mobile telephony device, where the user of the mobile telephony device subscribes to a voicemail messaging service. Under typical (single communication line) circumstances, once a voicemail message has been stored at the voicemail server, the voicemail server sends an indication of the waiting voicemail message to the mobile telephony device. The mobile telephony device may, responsive to receiving such an indication, signal to the user that the voicemail server has at least one voicemail message waiting. For instance, the signal may be a persistent icon on a part of a display screen of the mobile telephony device. The user may then use the mobile telephony device to place a call to the voicemail server and review the waiting voicemail message. The voicemail server uses Calling Line Identification (CLID) to associate an incoming call with a voicemail box and, once the user is authenticated, presents the waiting voicemail message to the user.

Under circumstance related to having a voicemail message to retrieve from a telephony device configured to have two, or more, communication lines, the user will first have to determine with which of the communication lines the voicemail message is associated. If the user determines that the voicemail message is associated with the active communication line, the user may simply perform standard actions necessary to contact the voicemail server and review the waiting voicemail message. However, if the user determines that the voicemail message is associated with a communication line that is not active, the user must take the steps to make the communication line active before performing standard actions necessary to contact the voicemail server and review the waiting voicemail message. Upon completion of the call to the voicemail server, the user is required to take the manual steps necessary to switch back the originally active communication line, assuming that the originally active communication line is the preferred line at the time.

It appears that the act of accessing voicemail on a telephony device that is configured to have two, or more, communication lines may be considered somewhat onerous.

BRIEF DESCRIPTION OF THE DRAWINGS

Reference will now be made to the drawings, which show by way of example, embodiments of the present application, and in which.

DETAILED DESCRIPTION OF THE EMBODIMENTS

As used herein, the term "examplary embodiment" is used merely to indicate that an embodiment serves as an example and it should not be considered that the example is, in any way, a preferred embodiment.

A telephony device that is configured to have two, or more, communication lines may receive an indication that a voicemail message is waiting at a voicemail server and with which of the communication lines the message is associated. Where the communication line with which the message is associated is not the active communication line, and responsive to receiving an instruction to access the voicemail server, the telephony device automatically switches from the active communication line to the communication line with which the message is associated and initiates a call to the voicemail server.

Advantageously, the user need not manually switch the active communication line to access the voicemail server. Further advantageously, the user need not know which communication line to use to access the voicemail server.

According to one aspect, there is provided a method of providing a user interface on a telephone station apparatus, the user interface facilitating selection, by a user, of an active communication line for calling a voicemail server, the telephone station apparatus providing access to a first communication line and a second communication line having voicemail message storage associated therewith at the voicemail server. The method includes receiving an input from the user, the input including an instruction to access the voicemail server, determining that the first communication line is the active communication line, switching, responsive to the determining, from the first communication line to the second communication line, and initiating a call, on the second communication line, to the voicemail server. Additionally, a telephone station apparatus is provided for carrying out this method and a computer readable medium is provided for containing instructions to allow a processor to carry out this method.

Other aspects and features will become apparent to those of ordinary skill in the art upon review of the following description of examplary embodiments in conjunction with the accompanying figures.

Figure 1:
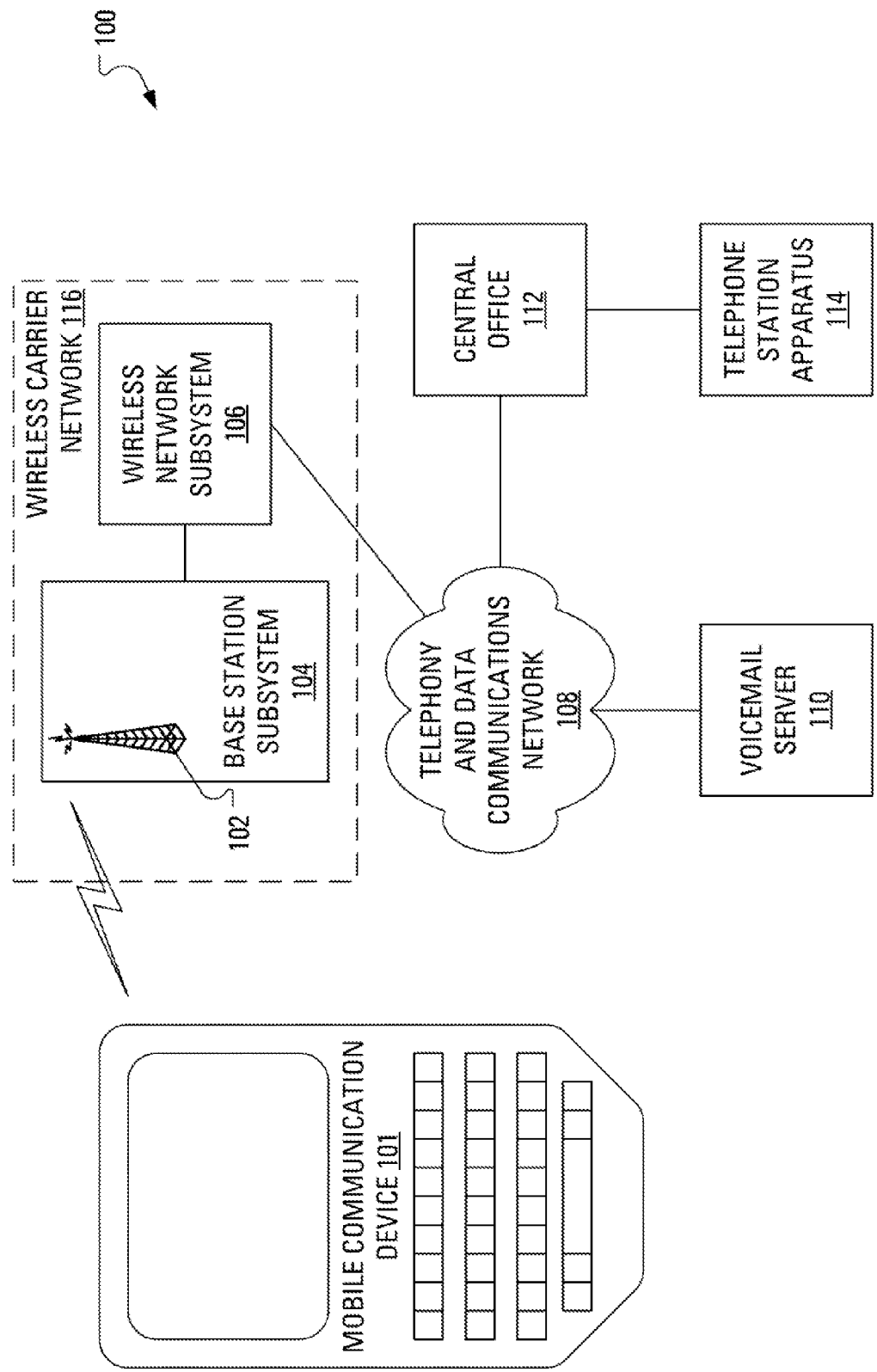
FIG. 1 illustrates elements of an examplary network environment for a mobile telephone station apparatus and a traditional land-line telephone station apparatus, each of which may be configured to have two, or more, communication lines.

Reference is now made to FIG. 1, which illustrates elements of an examplary network environment 100 for the operation of a mobile telephone station apparatus 101. The elements of the examplary network environment 100 include a wireless carrier network 116 and a telephony and data communication network 108.

The telephony and data communication network 108 may be considered to represent at least one wide area network, such as the present day Internet and successor networks, as well as, potentially, multiple local area networks and a public switched telephone network (PSTN).

The wireless carrier network 116 includes a base station subsystem 104 and a wireless network subsystem 106. A base station antenna 102, with which the mobile telephone station apparatus 101 may communicate wirelessly, is provided as part of the base station subsystem 104. The base station subsystem 104 connects to a wireless network subsystem 106. The wireless network subsystem 106, which may include, in part, a Mobile-services Switching Center (MSC), is connected to the telephony and data communication network 108.

Also connected to the telephony and data communication network 108 is a voicemail server 110 for performing voicemail services, such as receiving, storing, and providing voicemail messages.

A central office 112 allows a traditional land-line telephone station apparatus 114 to connect to and utilize the telephony and data communication network 108. Additionally, the land-line telephone station apparatus 114 can connect to the voicemail server 110. The land-line telephone station apparatus 114 can access the data communication network 108 or voicemail server 110 by an input device such as a keypad (not shown).

Figure 2:
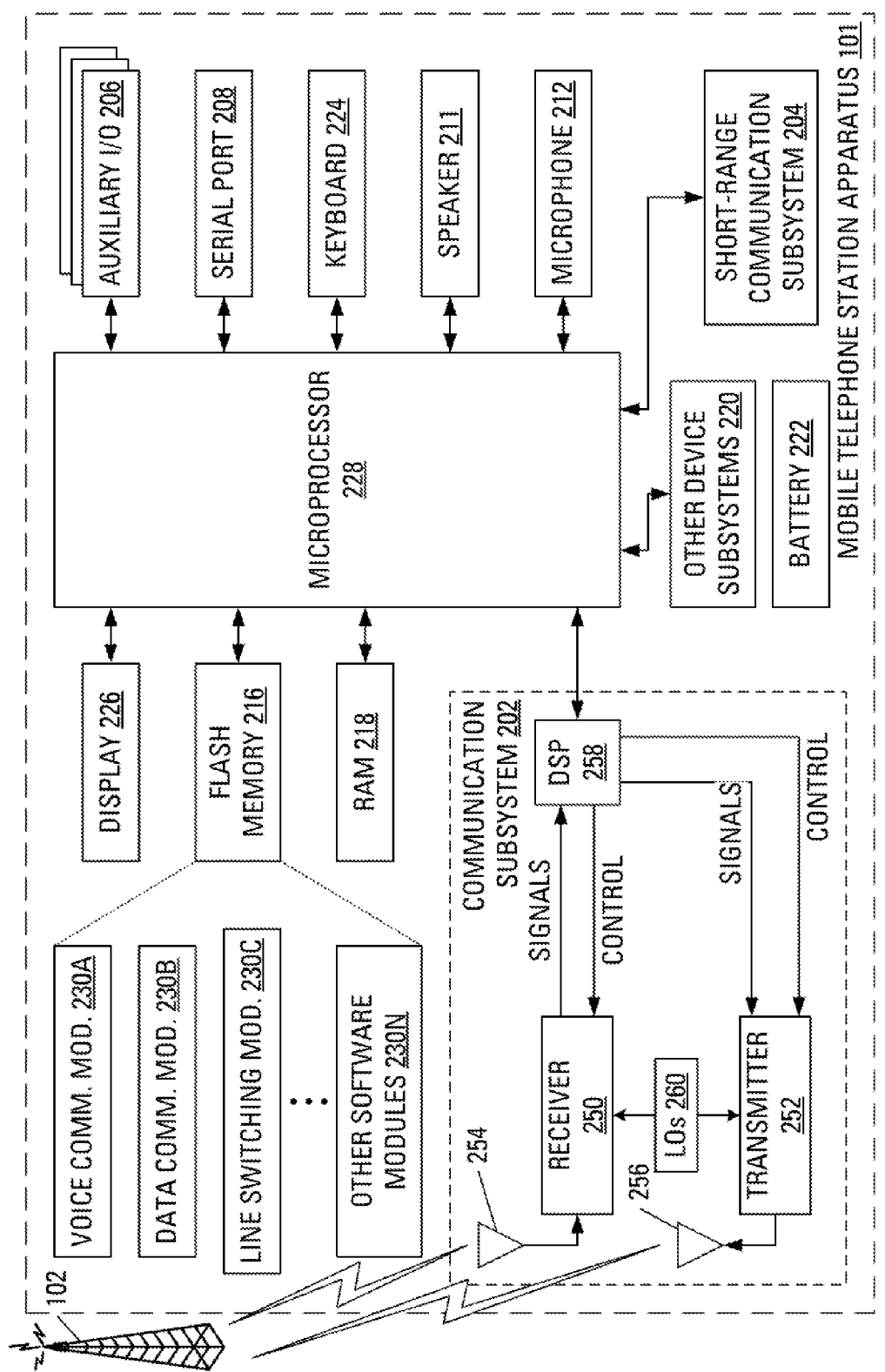
FIG. 2 schematically illustrates the mobile telephone station apparatus of FIG. 1 according to an examplary embodiment of the application.

FIG. 2 illustrates the mobile telephone station apparatus 101 including a housing, an input device (such as a keyboard 224 or a navigation tool (not shown)), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile telephone station apparatus 101, in response to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the mobile telephone station apparatus 101 are shown schematically in FIG. 2. These include: a communication subsystem 202; a short-range communication subsystem 204; the keyboard 224 and the display 226, along with other input/output devices including a set of auxiliary input/output devices 206, a serial port 208, a speaker 211 and a microphone 212; as well as memory devices including a flash memory 216 and a Random Access Memory (RAM) 218; and various other device subsystems 220. The mobile telephone station apparatus 101 may have a battery 222 to power the active elements of the mobile telephone station apparatus 101. The mobile telephone station apparatus 101 is preferably a two-way radio frequency (RF) communication device having voice and data communication capabilities. In addition, the mobile telephone station apparatus 101 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile telephone station apparatus 101. A predetermined set of software applications that control basic device operations, such as a voice communications module 230A and a data communications module 230B, may be installed on the mobile telephone station apparatus 101 during manufacture. A line switching module 230C may also be installed on the mobile telephone station apparatus 101 during manufacture, to implement aspects of the application. As well, additional software modules, illustrated in FIG. 2 as other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via the wireless carrier network 116. Preferably, the data items managed by the PIM application are seamlessly integrated, synchronized and updated via the wireless carrier network 116 with the device user's corresponding data items stored or associated with a host computer system.

Communication functions, including data and voice communications, may be performed through the communication subsystem 202 and, possibly, through the short-range communication subsystem 204. The communication subsystem 202 includes a receiver 250, a transmitter 252 and one or more antennas, illustrated in FIG. 2 as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile telephone station apparatus 101 is intended to operate. For example, the communication subsystem 202 of the mobile telephone station apparatus 101 may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), CDMA, Personal Communications Service (PCS), GSM, etc. Other types of data and voice networks, both separate and integrated, may also be utilized with the mobile telephone station apparatus 101.

When required network registration or activation procedures have been completed, the mobile telephone station apparatus 101 may send and receive communication signals over the wireless carrier network 116. Signals received from the base station antenna 102 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102 are processed (e.g., modulated and encoded) by the DSP 258 and are then provided to the transmitter 252 for digital to analog conversion, frequency up conversion, filtering, amplification and transmission to the base station antenna 102 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 202 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 224 and/or some other auxiliary I/O device 206, such as a touchpad, a rocker switch, a thumb-wheel, or some other type of input device. The composed data items may then be transmitted to the base station antenna 102 via the communication subsystem 202.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the mobile telephone station apparatus 101. In addition, the display 226 may also be utilized in voice communication mode, for example, to display the identity of a calling party, the duration of a voice call, or other voice call related information.

The short-range communication subsystem 204 enables communication between the mobile telephone station apparatus 101 and other proximate systems or devices, which need not necessarily be similar devices. For example, the short-range communication subsystem 204 may include an infrared device and associated circuits and components, or a Bluetooth™ communication module, to provide for communication with similarly-enabled systems and devices.

The conditions for receiving a voicemail message are generally well known. In the case of the land-line telephone station apparatus 114 (shown in FIG. 1), an incoming call to a called communication line may be redirected, by the central office 112, to the voicemail server 110 when the called communication line is engaged in another call (i.e., the communication line is busy) or when the called communication line is not answered after a predetermined number of rings. These two conditions also apply for the mobile telephone station apparatus 101. Additionally, an incoming call may be redirected to the voicemail server 110 when the mobile telephone station apparatus 101 to which the incoming call is destined is "out of service". When out of service, the mobile telephone station apparatus 101 may be turned off or may be in a place that limits the ability for the mobile telephone station apparatus 101 to communicate wirelessly with the base station antenna 102. In both fixed and wireless cases, a voicemail message may be generated within the voicemail server 110 by another user of the voicemail server and then stored in a destination voicemail box on the voicemail server 110.

When a voicemail message is in a voicemail box and has yet to be reviewed, the voicemail server 110 will typically indicate a "voicemail message waiting" condition to the telephone station apparatus 101 or 114 associated with the voicemail box. In the case of the land-line telephone station apparatus 114, often the dial tone on the communication line is made to stutter. Upon recognition of the stuttered dial tone by a telephone station apparatus 114 connected to the communication line, the telephone station apparatus 114 generates an external indication of a voicemail message awaiting consideration by the user. Often, the external indication is a flashing light. In the case of the mobile telephone station apparatus 101, it is typical that only one mobile telephone station apparatus 101 is associated with a telephone communication line. Accordingly, indicating on the communication line means indicating to the mobile telephone station apparatus 101. In the GSM, such indicating is typically performed using the Short Messaging Service (SMS). That is, the voicemail server 110 sends an SMS message to the mobile telephone station apparatus 101 indicating that a new voicemail message is available for review. The mobile telephone station apparatus 101, responsive to receiving such a message, can indicate, for example, by way of presenting a voicemail waiting sign on the display 226, that a new voicemail message is waiting. In some instances, the voicemail waiting sign can be specific to the communication line for which the voicemail message has been received.

In the ALS (GSM) case, a voicemail server 110 can indicate to a mobile telephone station apparatus 101 that a new voicemail message is waiting for the non-active communication line. Conversely, in the dual-NAM (CDMA) case, the non-active communication line is invisible to the base stations and, accordingly, a mobile telephone station apparatus 101 with communication line 1 active will not receive notification of a new voicemail message on communication line 2.

When a mobile telephone station apparatus 101 receives an indication of a new voicemail message, the mobile telephone station apparatus 101 generally presents an indication to the user that a new voicemail message is waiting. It is typical that the indication to the user, say, through the use of an icon on a display, specifies which of the multiple communication lines with which the voicemail message notification is associated.

The steps necessary to contact the voicemail server 110 from a telephone station apparatus 101 or 114 are known to be many and varied. For instance, a mobile telephone station apparatus 101 may be arranged to initiate a call to the voicemail sever 110 responsive to an extended press on the "1" button. In another case, a user of a mobile telephone station apparatus 101 may configure a "speed dial" number or a "voice dial" command to quickly initiate a call to the voicemail server 110. In a further case, a user of a mobile telephone station apparatus 101 may actuate an input device such as a keyboard 224 (shown in FIG. 2), thereby causing a menu to appear as part of a user interface presented on a display 226 (shown in FIG. 2) of the mobile telephone station apparatus 101. One of the menu items on the menu may be "Call Voicemail". In the case of a land-line telephone station apparatus 114, a call to the voicemail server 110 can be initiated by dialing the sequence "* 9 8" on a keypad of the land-line telephone station apparatus 114.

In the case wherein the telephone station apparatus 101 or 114 is configured to have two, or more, communication lines, whichever communication line is active at the time at which the user instructs the telephone station apparatus 101 or 114 to access the voicemail server 110 will be the communication line that is used to place a call to the voicemail server 110 associate with the communication line. The CLID of the incoming call to the voicemail server 110 is used by the voicemail server 110 to select a voicemail box the contents of which may be reviewed by the caller.

However, when the new voicemail message for which an indication has been displayed is associated with a non-active communication line, a call to the voicemail server 110 will allow the user to review messages in the voicemail box associated with the active communication line. Consequently, the voicemail server will 110 not allow the user to review the new voicemail message associated with the non-active communication line.

Upon determining that a new voicemail message is waiting for user consideration and is associated with the communication line that is not active, the user typically takes the steps necessary to make the other communication line active before performing actions necessary to contact the voicemail server 110 and review the waiting voicemail message. Upon completion of the call to the voicemail server 110, the user is required to take the steps necessary to switch back the originally active communication line, assuming that the originally active communication line is the preferred communication line at the time.

In overview, a user may receive, at a telephone station apparatus 101 or 114, an indication that a new voicemail message is waiting at the voicemail server 110 for review by the user. Where the communication line with which a waiting voicemail message is associated is not the active communication line and responsive to receiving an instruction to access the voicemail server 110, the telephone station apparatus 101 or 114 automatically switches from the active communication line to the communication line with which the message is associated and initiates a call to the voicemail server 110.

In one examplary embodiment, selection of the "Call Voicemail" menu item invokes presentation of a pop-up dialog box showing a graphic button associated with each of the communication lines associated with the telephone station apparatus 101 or 114. The user may then employ an input device (such as a keyboard 224, a navigation tool or a keypad) to select one of the graphic buttons, thereby instructing the telephone station apparatus 101 or 114 which communication line to use to access the voicemail server 110. Responsively, the telephone station apparatus 101 or 114 switches, if necessary, to the selected communication line and initiates a call to the voicemail server 110. Furthermore, to give the user additional information, each communication line-associated graphic button in the dialog box may include an additional sign, where the sign signifies that a voicemail message waiting indication has been received from the voicemail server 110, which indication is associated with the communication line associated with the graphic button having the additional sign.

If the active communication line does not have a voicemail on it and the non-active communication line does, the user can simply press the voicemail speed-dial button and the telephone station apparatus 101 or 114 will change the communication line automatically for the user and dial the number (with any additional tones). After the call has been completed, the telephone station apparatus 101 or 114 can optionally switch back to the original active communication line.

Figure 3:
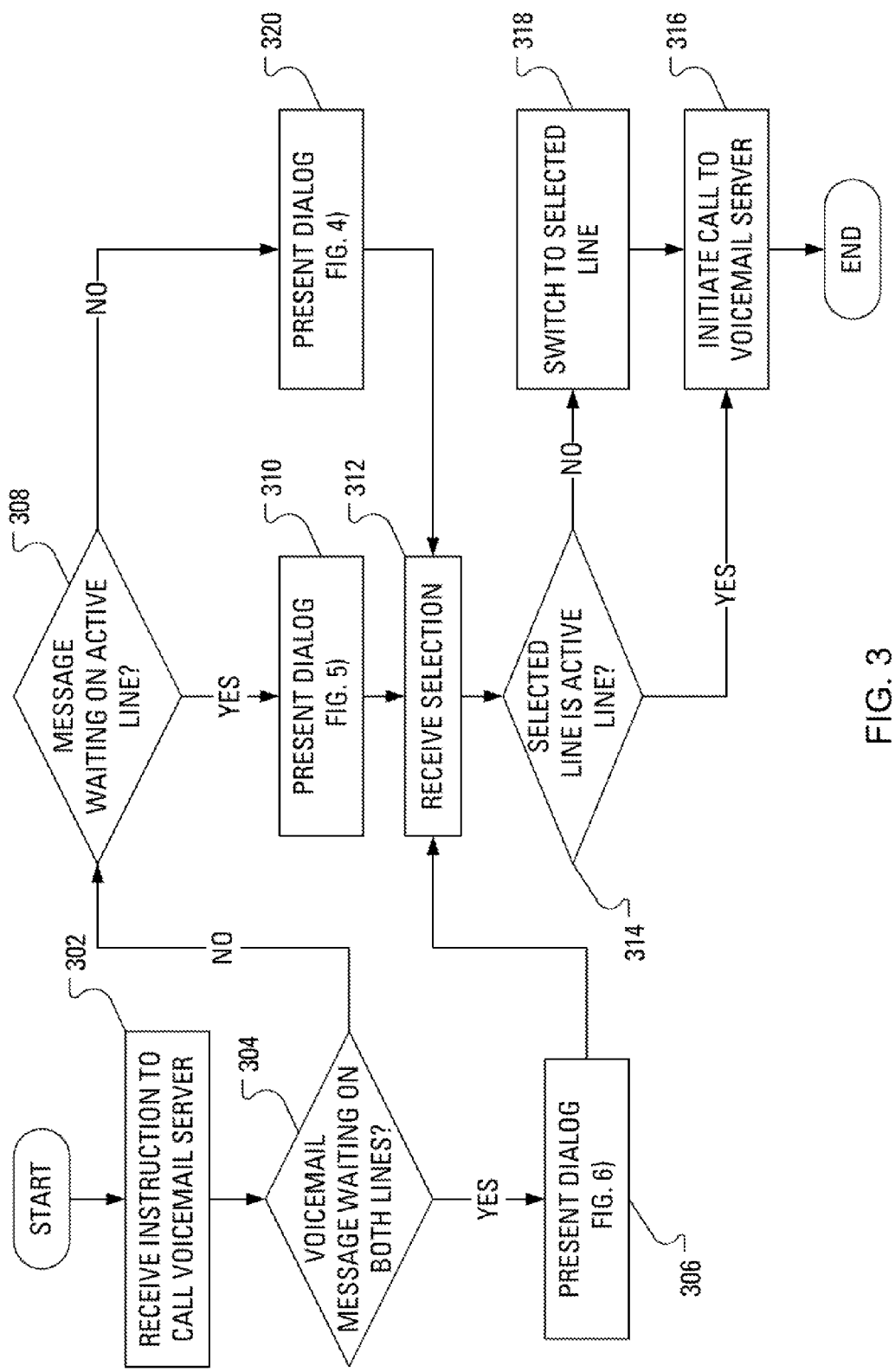
FIG. 3 illustrates steps of an examplary method of placing a call on a second communication line, according to an examplary embodiment of the application.

Reference is now made to FIG. 3, which illustrates examplary steps in a method of placing a call, on a communication line associated with a voicemail message, to the voicemail server 110 (shown in FIG. 1). The telephone station apparatus 101 or 114 (shown in FIG. 1) that is to perform the examplary steps of FIG. 3 is associated with two examplary communication lines: a Business line; and a Personal line. In the presently described examplary embodiment, the telephone station apparatus 101 or 114 has been configured so that the Personal line is active and the telephone station apparatus 101 or 114 has received at least one indication from the voicemail server 110 that a voicemail message is awaiting consideration by user. However, it can be appreciated that the method can be implemented on a telephone station apparatus 101 or 114 having multiple communication lines, with one or more communication lines having voicemail message services associated therewith.

While the examples presented hereinafter focus on the mobile telephone station apparatus 101, it should be clear to a person of ordinary skill in the art that the discussion applies equally to the land-line telephone station apparatus 114. Further, while components of the mobile telephone station apparatus 101 have been discussed and presented in FIG. 2, it should be clear that many of the same components (e.g., the display 226, the microprocessor 228, the auxiliary I/O devices 206) may be found in the land-line telephone station apparatus 114.

In operation, a user of the telephone station apparatus 101 or 114 may be prompted to call the voicemail server 110. The prompting may take the form of the previously discussed stuttering dial tone or an icon presented on the display 226. Responsive to the prompting, a user of the telephone station apparatus 101 or 114 manipulates a telephone station apparatus input device (such as the keyboard 224 in FIG. 2 or a keypad) to give an instruction to the telephone station apparatus 101 or 114 to place a call to the voicemail server 110. As discussed hereinbefore, the user may, for instance, manipulate the input device to cause a menu to appear on the user interface on the display 226.

Subsequently, the user may, through further input device manipulation, select a menu item "Call Voicemail". The telephone station apparatus, or, more precisely, the microprocessor 228 of the mobile telephone station apparatus 101, receives the instruction (step 302) and, responsive to receiving the instruction, determines (steps 304, 308) which communication line (or communication lines) is associated with the waiting voicemail message.

In the case wherein the waiting voicemail message is only associated with one communication line, as determined in step 304, the microprocessor 228 determines (step 308) whether the waiting voicemail message is associated with the active communication line.

Figure 4:
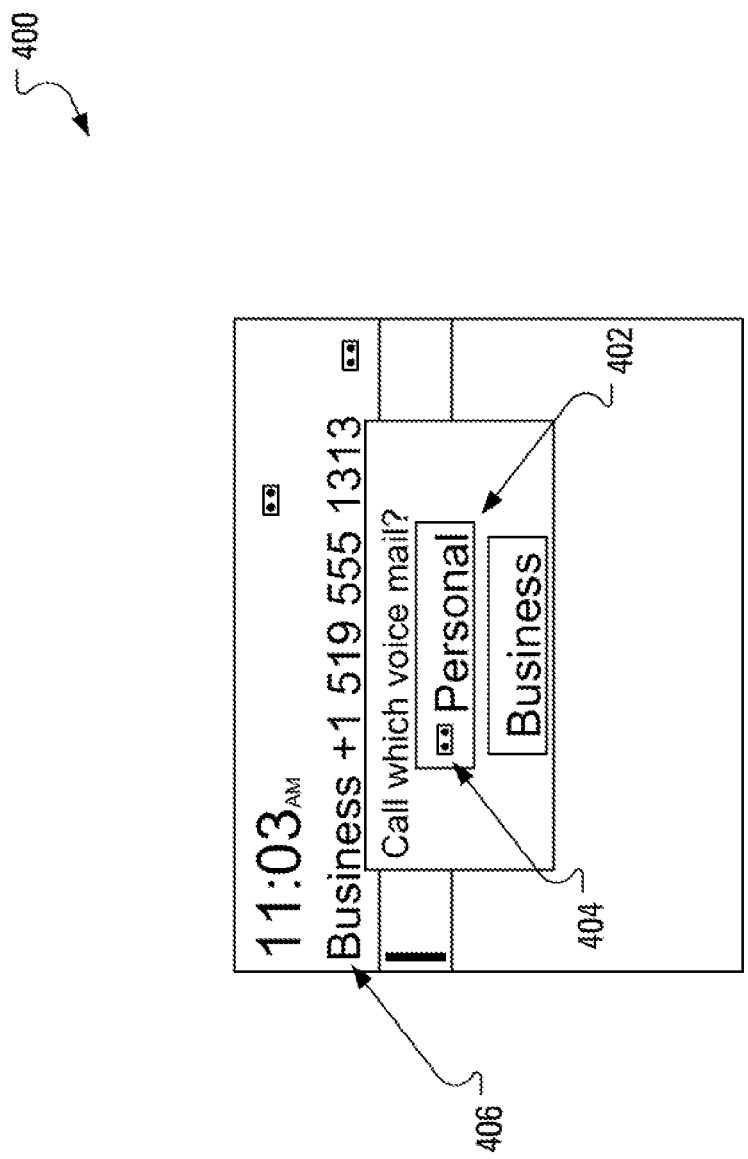
FIG. 4 illustrates a first dialog box, presented to a user according to an examplary embodiment of the application.

In the case wherein the waiting voicemail message is associated with the communication line that is not active, the microprocessor 228 arranges (step 320) the presentation of a dialog, on the display 226, that gives the user an opportunity to select which of the two communication lines to employ to access the voicemail server 110. A first examplary dialog 400 is illustrated in FIG. 4. As illustrated in FIG. 4, a default selection 402 is provided as the communication line that is associated with the waiting voicemail message. For this example, the waiting voicemail message is associated with the Personal line, as indicated by a voicemail waiting sign 404 associated with the graphic button 402 that represents the Personal line. Accordingly, the graphic button 402 that represents the Personal line is the default selection in the first examplary dialog 400. Note that the first examplary dialog 400, illustrated in FIG. 4, includes an active communication line indicator 406 to remind the user which of the available communication lines is active.

Upon receiving (step 312) a selection from user of a communication line (in the presently described examplary embodiment the Personal line) to employ to access the voicemail server 110, the microprocessor 228 determines (step 314) whether the selected communication line is the active communication line.

In the case wherein the microprocessor 228 determines (step 314) that the selected communication line is the not the active communication line, the microprocessor 228 switches communication lines (step 318) such that the selected communication line becomes the active communication line. That is, the microprocessor 228 makes the selected communication line active. The microprocessor 228 then initiates (step 316) a call to the voicemail server 110.

At the voicemail server 110, the incoming call is received and answered. According to the CLID information associated with the incoming call, the voicemail server 110 presents the incoming call with access to the voicemail box associated with the Personal line. As is customary, the user is likely to be required to successfully complete an authentication procedure before being allowed to review the waiting voicemail message.

After determining, in step 304, that the waiting voicemail message is only associated with one communication line, the microprocessor 228 may determine (step 308) that the waiting voicemail message is associated with the active communication line.

Figure 5:
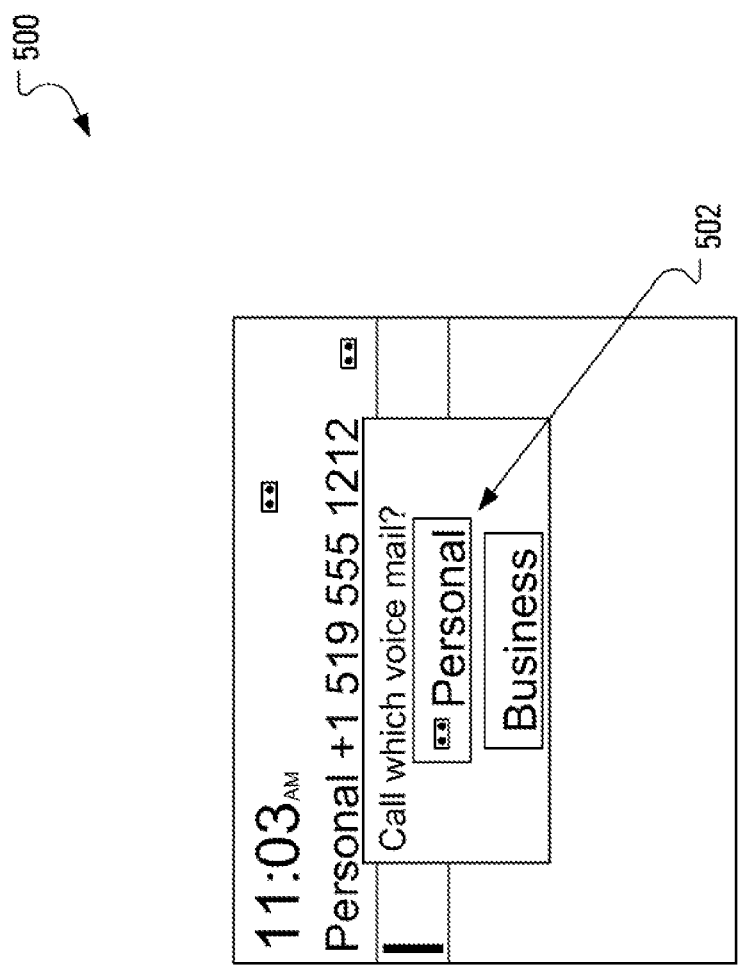
FIG. 5 illustrates a second dialog box, presented to a user according to an examplary embodiment of the application.

In the case wherein the waiting voicemail message is associated with the active communication line, the microprocessor 228 arranges (step 310) the presentation of a dialog that gives the user an opportunity to select which of the two communication lines to employ to access the voicemail server 110. A second examplary dialog 500 is illustrated in FIG. 5. As illustrated in FIG. 5, a default selection 502 is provided as the communication line that is associated with the waiting voicemail message. For this example, the waiting voicemail message is associated with the Personal line. Accordingly, the graphic button 502 that represents the Personal line is the default selection in the second examplary dialog 500.

Upon receiving (step 312) a selection of a communication line (in the presently described examplary embodiment, the selected communication line is the Personal line) to employ to access the voicemail server 110, the microprocessor 228 determines (step 314) whether the selected communication line is the active communication line.

In the case wherein the microprocessor 228 determines (step 314) that the selected communication line is the active communication line, the microprocessor 228 need not switch to the selected communication line. That is, the microprocessor proceeds with the selected communication line active. The microprocessor then initiates (step 316) a call to the voicemail server 110.

At the voicemail server 110, the incoming call is received and answered. According to the CLID information associated with the incoming call, the voicemail server 110 presents the incoming call with access to the voicemail box associated with the Personal line. As is customary, the user is likely to be required to successfully complete an authentication procedure before being allowed to review the waiting voicemail message.

Figure 6:
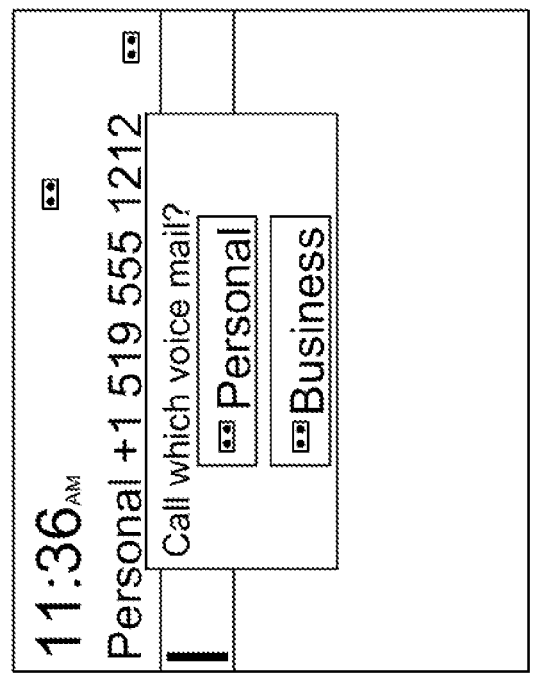
FIG. 6 illustrates a third dialog box, presented to a user according to an examplary embodiment of the application.

In the case wherein waiting voicemail messages are associated with both communication lines, as determined in step 304, the microprocessor 228 need not determine which communication line to associate with the waiting voicemail message. Rather, the microprocessor 228 arranges (step 306) the presentation of a dialog that gives the user an opportunity to select which of the two communication lines to employ to access the voicemail server 110. A third examplary dialog 600 is illustrated in FIG. 6. As illustrated in FIG. 6, a default selection 602 is the active communication line. For this example, the waiting voicemail message is associated with the both communication lines and the Personal line is active. Accordingly, the graphic button 602 that represents the Personal line is the default selection in the second examplary dialog 600.

Upon receiving (step 312) a selection of a communication line (in the presently described examplary embodiment, the selected communication line is the Personal line) to employ to access the voicemail server 110, the microprocessor 228 determines (step 314) whether the selected communication line is the active communication line.

In the case wherein the microprocessor 228 determines (step 314) that the selected communication line is the active communication line, the microprocessor 228 initiates (step 316) a call to the voicemail server 110.

At the voicemail server 110, the incoming call is received and answered. According to the CLID information associated with the incoming call, the voicemail server 110 presents the incoming call with access to the voicemail box associated with the Personal line. As is customary, the user is likely to be required to successfully complete an authentication procedure before being allowed to review the waiting voicemail message.

Figure 7:
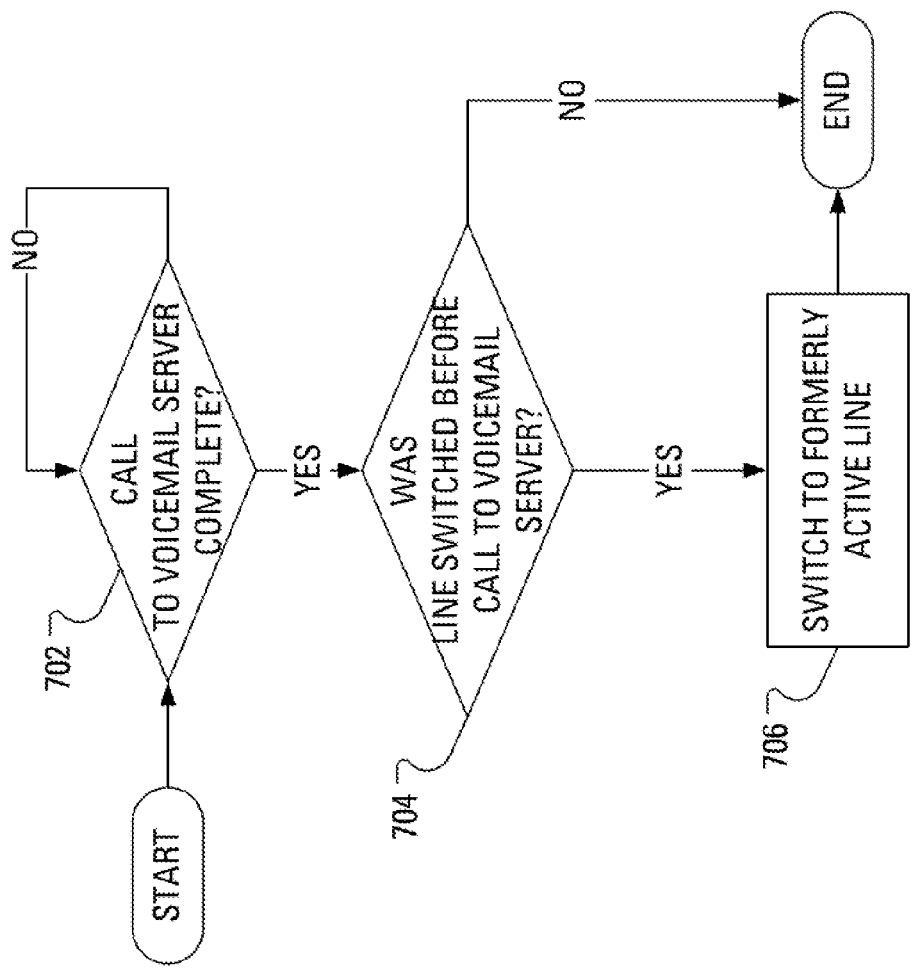
FIG. 7 illustrates steps of an examplary method of handling the end of a call to a voicemail server, according to an examplary embodiment of the application.

Steps in an examplary method of handling the end of a call to the voicemail server 110 are illustrated in FIG. 7.

Referring to FIG. 7, in one examplary embodiment, while the call to the voicemail server 110 is ongoing, the microprocessor 228 monitors the call to determine (step 702) whether the call is complete. If it is determined that the call continues, the monitoring (step 702) also continues. If it is determined that the call is complete, the microprocessor 228 then determines (step 704) whether a switch to another communication line has occurred before the call to the voicemail server 110.

To prepare for the determination that may be made in step 704, the microprocessor 228 may, as part of step 318 wherein the microprocessor 228 performs a switch such that a selected communication line becomes the active communication line, record at least two items of information. In particular, the microprocessor 228 may record: (1) that a switch has been performed; and (2) an identity of the formerly active communication line.

If the microprocessor 228 determines (step 704) that a switch to another communication line did not occur before the call to the voicemail server 110 (i.e., the call to the voicemail server 110 was made on the already active communication line), no switch back to a formerly active communication line is necessary. However, if the microprocessor 228 determines (step 704) that a switch to another communication line has occurred before the call to the voicemail server 110, the microprocessor 228 can use the recorded identity of the formerly active communication line and perform a switch (step 706) back to the identified communication line.

As illustrated in each of FIGS. 4, 5 and 6, when a dialog is presented to provide a choice of communication lines to be used to access the voicemail server 110, one of the communication lines is pre-selected as a default communication line. Where only one communication line has one or more voicemail messages waiting, that communication line is pre-selected as the default communication line. Where more than one communication line has one or more voicemail messages waiting and the active communication line has one or more voicemail messages waiting, the microprocessor 228 may pre-select the active communication line as the default communication line. In alternative embodiments, where more than one communication line has one or more voicemail messages waiting, the microprocessor 228 may pre-select the communication line having more voicemail messages waiting than other available communication lines as the default communication line. Further alternatively, where more than one communication line has one or more voicemail messages waiting, the microprocessor 228 may pre-select the communication line having more recent voicemail messages waiting than other available communication lines as the default communication line.

As is known, while employing ALS, the mobile telephone station apparatus 101 with the Business line set to be the active communication line, as illustrated by active communication line indicator 406 in the examplary embodiment of FIG. 4, may receive a notification that a voicemail message is waiting at the voicemail sever 110. The notification may indicate that the voicemail message is associated with either the Business line or the Personal line.

In contrast, while employing dual-NAM, the mobile telephone station apparatus 101 with the Business line set to be the active communication line may only receive notifications that a voicemail message is waiting at the voicemail sever 110 for the Business line. Any notifications generated at the voicemail sever 110 for the Personal line will not reach the dual-NAM mobile telephone station apparatus 101 until the dual-NAM mobile telephone station apparatus 101 is switched to the Personal line.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method comprising:
receiving an input at a telephone station apparatus, the input including an instruction to access a voicemail server, the telephone station apparatus providing access to a first communication line and a second communication line, each of the first communication line and the second communication line having voicemail message storage associated therewith at the voicemail server;
responsive to the receiving, the telephone station apparatus pre-selecting, based on a pre-selecting consideration, the second communication line as a default communication line that will be used to call the voicemail server in the absence of receipt of further input;
presenting a user interface dialog allowing selection of a communication line to use to call the voicemail server, the user interface dialog indicating the default communication line;
receiving an indication of selection of the second communication line;
determining that the first communication line is the active communication line;
switching, responsive to the determining, from the first communication line to the second communication line; and
initiating a call, on the second communication line, to the voicemail server.

2. The method of claim 1 further comprising indicating availability of a voicemail message associated with the second communication line at the voicemail server.

3. The method of claim 2 further comprising, before the indicating:
receiving an indication of availability of the voicemail message at the voicemail server; and
performing an analysis of the indication to determine that the voicemail message is associated with the second communication line.

4. The method of claim 2 wherein the indicating comprises presenting an icon on a display of the telephone station apparatus.

5. The method of claim 4 further comprising providing, while presenting the user interface dialog, an indication that the voicemail message is associated with the second communication line.

6. The method of claim 1 wherein the pre-selecting comprises identifying the second communication line as having more voicemail messages waiting than the first communication line.

7. The method of claim 1 wherein the pre-selecting comprises identifying the second communication line as having a voicemail message waiting that is more recent than voicemail message waiting for the first communication line.

8. The method of claim 1 further comprising:
recording that the switching to the second communication line has been performed; and
recording an identity of the first communication line as a formerly active line.

9. The method of claim 8 further comprising:
determining that the call to the voicemail server is complete;
determining that the switching to the second communication line has occurred before the initiating;
determining that the first communication line is the formerly active line; and switching from the second communication line to the first communication line.

10. A telephone station apparatus comprising:
an input device adapted to receive an input the input including an instruction to access a voicemail server, the telephone station apparatus providing access to a first communication line and a second communication line, each of the first communication line and the second communication line having voicemail message storage associated therewith at the voicemail server;
a processor adapted to:
pre-select, based on pre-selecting consideration, the second communication line as a default communication line that will be used to call the voicemail server in the absence of further user input;
present a user interface dialog allowing selection of a communication line to use to call the voicemail server, the user interface dialog indicating the default communication line;
receive an indication of selection of the second communication line;
determine that the first communication line is the active communication line;
switch, responsive to the determining, from the first communication line to the second communication line; and
arrange initiation of a call, on the second communication line, to the voicemail server.

11. The telephone station apparatus of claim 10 further comprising an output device adapted to indicate availability of a voicemail message associated with the second communication line at the voicemail server.

12. A non-transitory computer readable storage medium containing computer-executable instructions that, when performed by a processor in a telephone station apparatus, cause the processor to:
receive an input at the telephone station apparatus, the input including an instruction to access a voicemail server, the telephone station apparatus providing access to a first communication line and a second communication line, each of the first communication line and the second communication line having voicemail message storage associated therewith at the voicemail server;
pre-select, based on pre-selecting consideration, the second communication line as a default communication line that will be used to call the voicemail server in the absence of further user input;
present a user interface dialog allowing selection of a communication line to use to call the voicemail server, the user interface dialog indicating the default communication line;
receive an indication of selection of the second communication line;
determine that the first communication line is the active communication line;
switch, responsive to the determining, from the first communication line to the second communication line; and
initiate a call, on the second communication line, to the voicemail server.

13. The non-transitory computer readable medium of claim 12 further causing the processor to indicate availability of a voicemail message associated with the second communication line at the voicemail server.

* * * * *